US012752651B2

(12) United States Patent
Prasad et al.

(10) Patent No.: US 12,752,651 B2
(45) Date of Patent: Oct. 6, 2026

(54) PRECHARGING USING A MOTOR-INVERTER SYSTEM

(71) Applicant: GM GLOBAL TECHNOLOGY OPERATIONS LLC, Detroit, MI (US)

(72) Inventors: Rashmi Prasad, Troy, MI (US); Chandra S. Namuduri, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/985,689

(22) Filed: Dec. 18, 2024

(65) Prior Publication Data

US 2026/0167028 A1 Jun. 18, 2026

(51) Int. Cl.
*B60L 53/24* (2019.01)
*B60L 53/16* (2019.01)
*H02J 7/00* (2026.01)

(52) U.S. Cl.
CPC ............... *B60L 53/24* (2019.02); *B60L 53/16* (2019.02); *H02J 7/855* (2026.01); *B60L 2210/10* (2013.01)

(58) Field of Classification Search
None
See application file for complete search history.

(56) References Cited

U.S. PATENT DOCUMENTS

2020/0298722 A1* 9/2020 Smolenaers ............ H02J 7/345
2020/0406768 A1* 12/2020 Pfeilschifter ............. B60L 3/00
2021/0252990 A1* 8/2021 Wang ...................... B60L 53/22
2023/0398888 A1* 12/2023 Ranjbar .................. B60L 53/11

* cited by examiner

*Primary Examiner* — Daniel C Puentes
*Assistant Examiner* — Aqeel H Bukhari
(74) *Attorney, Agent, or Firm* — CANTOR COLBURN LLP

(57) ABSTRACT

A system for charging a battery includes a charge port configured to be electrically connected to an inverter and a multi-phase electric motor, the inverter and the electric motor configured to be powered by a battery, and a charging system including a charge port bus configured to electrically connect a charge port to a phase of the electric motor and to a direct current (DC)-DC converter. A phase of the inverter and the electric motor forms a power factor correction (PFC) stage and the DC-DC converter forms part of a DC-DC conversion stage, and the charging system includes a precharge circuit configured to be electrically connected to the charge port bus. The system also includes a controller configured to control the precharge circuit to precharge one or more components of the charging system.

20 Claims, 7 Drawing Sheets

PRECHARGING USING A MOTOR-INVERTER SYSTEM

BACKGROUND

The subject disclosure relates to energy or power transfer, and more particularly to systems and methods for controlling power transfer among energy storage systems having different parameters.

Vehicles, including gasoline and diesel powered vehicles, as well as electric and hybrid electric vehicles, feature battery storage for purposes such as powering electric motors, electronics and other vehicle subsystems. Battery assemblies may be charged using dedicated charging stations and other power sources such as residences and buildings connected to a power grid. For example, electric and hybrid vehicles typically include a charging control system, such as an On-Board Charging Module (OBCM) that controls the rate and power at which a battery of the vehicle is charged. It is desirable to provide a system that reduces the size and/or number of components in a charging control system.

SUMMARY

In one exemplary embodiment, a system for charging a battery includes a charge port configured to be electrically connected to an inverter and a multi-phase electric motor, the inverter and the electric motor configured to be powered by a battery, and a charging system including a charge port bus configured to electrically connect a charge port to a phase of the electric motor and to a direct current (DC)-DC converter. A phase of the inverter and the electric motor forms a power factor correction (PFC) stage and the DC-DC converter forms part of a DC-DC conversion stage, and the charging system includes a precharge circuit configured to be electrically connected to the charge port bus. The system also includes a controller configured to control the precharge circuit to precharge one or more components of the charging system.

In addition to one or more of the features described herein, the inverter and the electric motor are part of a propulsion system of a vehicle.

In addition to one or more of the features described herein, the inverter, the electric motor and the battery are connected in parallel to a propulsion bus.

In addition to one or more of the features described herein, the charge port bus is connected to an active switch half bridge forming part of the PFC stage.

In addition to one or more of the features described herein, the charging system includes at least one switch connected to the charge port bus, the at least one switch configured to be opened to isolate the precharge circuit and the charge port from the propulsion bus.

In addition to one or more of the features described herein, the precharge circuit includes a switch across the charge port bus, and a variable resistor connected to the charge port bus in parallel with the switch.

In addition to one or more of the features described herein, the precharge circuit includes a first switch across the charge port bus, a second switch connected in series with a resistor, the second switch and the resistor connected to the charge port bus in parallel with the first switch.

In addition to one or more of the features described herein, the DC-DC converter is connected to the propulsion bus in parallel with the inverter and the electric motor, or the DC-DC converter is electrically isolated from the propulsion bus.

In another exemplary embodiment, a method of controlling an electrical system includes receiving a request to initiate a transition to a desired operating mode, the desired operating mode being one of a propulsion mode and a charging mode. The electrical system includes an inverter and a multi-phase electric motor configured to be powered by a battery via a propulsion bus, a charge port configured to be electrically connected to the inverter and the multi-phase electric motor, and a charging system including a charge port bus configured to electrically connect the charge port to a phase of the electric motor and to a direct current (DC)-DC converter, where part of the inverter and the electric motor form a power factor correction (PFC) stage and the DC-DC converter forms part of a DC-DC conversion stage, and the charging system includes a precharge circuit configured to be electrically connected to the charge port bus. The method also includes disconnecting the battery from the propulsion bus, precharging at least the propulsion bus by electrically connecting the precharge circuit to the charge port bus, and controlling the electrical system according to the desired operating mode.

In addition to one or more of the features described herein, the inverter and the electric motor are part of a propulsion system of a vehicle.

In addition to one or more of the features described herein, the inverter, the electric motor and the battery are connected in parallel to the propulsion bus.

In addition to one or more of the features described herein, electrically connecting the precharge circuit includes closing at least one switch connected to the charge port bus, the at least one switch configured to be opened to isolate the precharge circuit and the charge port from the propulsion bus.

In addition to one or more of the features described herein, the precharge circuit includes a switch across the charge port bus, and a variable resistor connected to the charge port bus in parallel with the switch.

In addition to one or more of the features described herein, the precharge circuit includes a first switch across the charge port bus, a second switch connected in series with a resistor, the second switch and the resistor connected to the charge port bus in parallel with the first switch.

In addition to one or more of the features described herein, the DC-DC converter is connected to the propulsion bus in parallel with the inverter and the electric motor, or the DC-DC converter is electrically isolated from the propulsion bus.

In yet another exemplary embodiment, a vehicle system includes a battery, an inverter and a multi-phase electric motor connected in parallel to a propulsion bus, a charge port configured to be electrically connected to the inverter and the electric motor, and a charging system including a charge port bus configured to electrically connect a charge port to a phase of the electric motor and to a direct current (DC)-DC converter. A phase of the inverter and the electric motor forms a power factor correction (PFC) stage and the DC-DC converter forms part of a DC-DC conversion stage, and the charging system includes a precharge circuit configured to be electrically connected to the charge port bus. The vehicle system also includes a controller configured to control the precharge circuit to precharge one or more components of the charging system.

In addition to one or more of the features described herein, the charging system includes at least one switch connected to the charge port bus, the at least one switch configured to be opened to isolate the precharge circuit and the charge port from the propulsion bus.

In addition to one or more of the features described herein, the precharge circuit includes a switch across the charge port bus, and a variable resistor connected to the charge port bus in parallel with the switch.

In addition to one or more of the features described herein, the precharge circuit includes a first switch across the charge port bus, a second switch connected in series with a resistor, the second switch and the resistor connected to the charge port bus in parallel with the first switch.

In addition to one or more of the features described herein, the DC-DC converter is connected to the propulsion bus in parallel with the inverter and the electric motor, or the DC-DC converter is electrically isolated from the propulsion bus.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
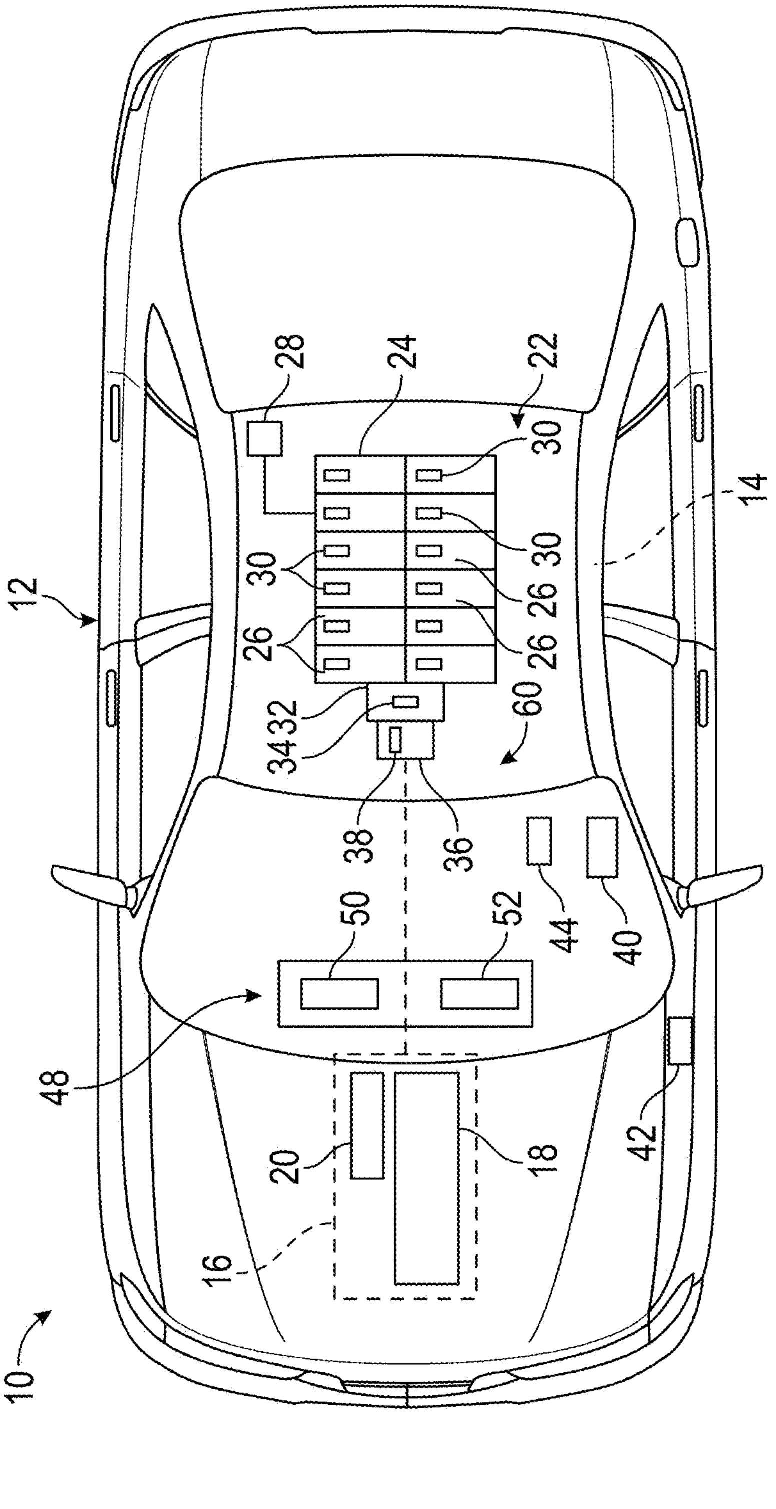
FIG. 1 is a top schematic view of a motor vehicle including a battery system, in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with one or more exemplary embodiments, methods, devices and systems are provided for controlling charging or power transfer operations. An embodiment of a charging system is connected to a vehicle propulsion system. The vehicle propulsion system includes a battery, an inverter and an electric motor connected to a propulsion bus. Components of the charging system may be included in a charging module, such as an onboard charging module (OBCM).

The charging system includes a precharge circuit that is configured for use to precharge components of the charging system and/or the propulsion system, in conjunction with a desired operating mode. The precharge circuit is connected to a charge port (e.g., a multi-directional alternating current (AC)/direct current (DC) charge port) via a charging bus.

The charging system includes a power factor correction (PFC) stage and a DC-DC conversion stage. The DC-DC conversion stage may utilize a DC-DC converter that is electrically connected to the propulsion bus, or an isolated DC-DC converter. In an embodiment, the charging system utilizes components of the motor and inverter as part of the PFC stage.

Embodiments described herein present numerous advantages and technical effects. For example, the embodiments provide for improvements in charging and electrical systems by providing a dedicated precharge circuit, which allows for typical main precharge circuits to be eliminated. In addition, by utilizing a motor-inverter system for PFC, embodiments reduce the number of components needed in an OBCM or other component of an electrical system. For example, embodiments allow for the exclusion of a dedicated main precharge circuit in a battery disconnect unit (BDU) of an electric or hybrid vehicle.

The embodiments are not limited to use with any specific vehicle or device or system that utilizes battery assemblies, and may be applicable to various contexts. For example, embodiments may be used with automobiles, trucks, aircraft, construction equipment, farm equipment, automated factory equipment and/or any other device or system that may use charging systems as described herein.

FIG. 1 shows an embodiment of a motor vehicle 10, which includes a vehicle body 12 defining, at least in part, an occupant compartment 14. The vehicle body 12 also supports various vehicle subsystems including a propulsion system 16, and other subsystems to support functions of the propulsion system 16 and other vehicle components, such as a braking subsystem, a suspension system, a steering subsystem, a fuel injection subsystem, an exhaust subsystem and others.

The vehicle 10 may be a combustion engine vehicle, an electrically powered vehicle (EV) or a hybrid electric vehicle (HEV). In an example, the vehicle 10 is a hybrid vehicle that includes a combustion engine 18 and an electric motor 20.

The vehicle 10 includes a battery system 22, which may be electrically connected to the motor 20 and/or other components, such as vehicle electronics. In an embodiment, the battery system 22 includes a battery assembly such as a high voltage battery pack 24 having a plurality of battery modules 26. Each of the battery modules 26 includes a number of individual cells (not shown). The battery system 22 may also include a monitoring unit 28 configured to receive measurements from sensors 30. Each sensor 30 may be an assembly or system having one or more sensors for measuring various battery and environmental parameters, such as temperature, current and voltages. The monitoring unit 28 includes components such as a processor, memory, an interface, a bus and/or other suitable components.

The battery system 22 includes various conversion devices for controlling the supply of power from the battery pack 24 to the motor 20 and/or electronic components. The conversion devices include a DC-DC converter module 32 including a DC-DC converter 34. The conversion devices also include an inverter module 36 that includes an inverter 38. The inverter 38 receives DC power from the DC-DC converter 34 and converts DC power to AC power that is supplied to the electric motor 20.

The vehicle 10 also includes a charging system, which can be used to charge the battery system 22 and/or to supply power from the battery system 22 to charge another energy storage system (e.g., vehicle-to-vehicle (V2V) and/or vehicle-to-everything (V2X) charging). The vehicle charging system includes a charging control device 40, such as an onboard charging module (OBCM) 40 connected to a charge port 42.

The vehicle 10 includes at least one processor or processing device for controlling aspects of identifying and recommending charging stations, referred to as a processor 44. The processor 44 may be a separate device as shown, or part of the vehicle 10's monitoring and/or navigation systems. It is noted that embodiments are not limited to any specific controller or processing device, and may encompass multiple processors or control devices.

The vehicle 10 also includes a computer system 48 that includes one or more processing devices 50 and a user interface 52. The computer system 48 may communicate with a controller or vehicle system, for example, to provide commands thereto in response to a user input. The various processing devices, modules and units may communicate with one another via a communication device or system, such as a controller area network (CAN) or transmission control protocol (TCP) bus.

FIGS. 2-6 depict embodiments of an electrical system 60 of the vehicle 10. It is noted that the electrical system 60 is discussed in conjunction with the vehicle 10 for illustration purposes. Embodiments are not limited to a specific vehicle or system, as embodiments may be used in conjunction with any suitable chargeable system having a motor and inverter.

In the embodiments of FIGS. 2-6, charging and discharging a battery, such as the battery pack 24, is performed using a motor-inverter system for performing power factor correction (PFC). In other words, when a power source is connected to the electrical system 60 for charging, the motor 20 and the inverter 38 form part of a PFC stage. The electrical system includes a DC-DC converter 62, such as an existing DC-DC converter (e.g., the DC-DC converter 34 of FIG. 1), or a dedicated converter.

Figure 2:
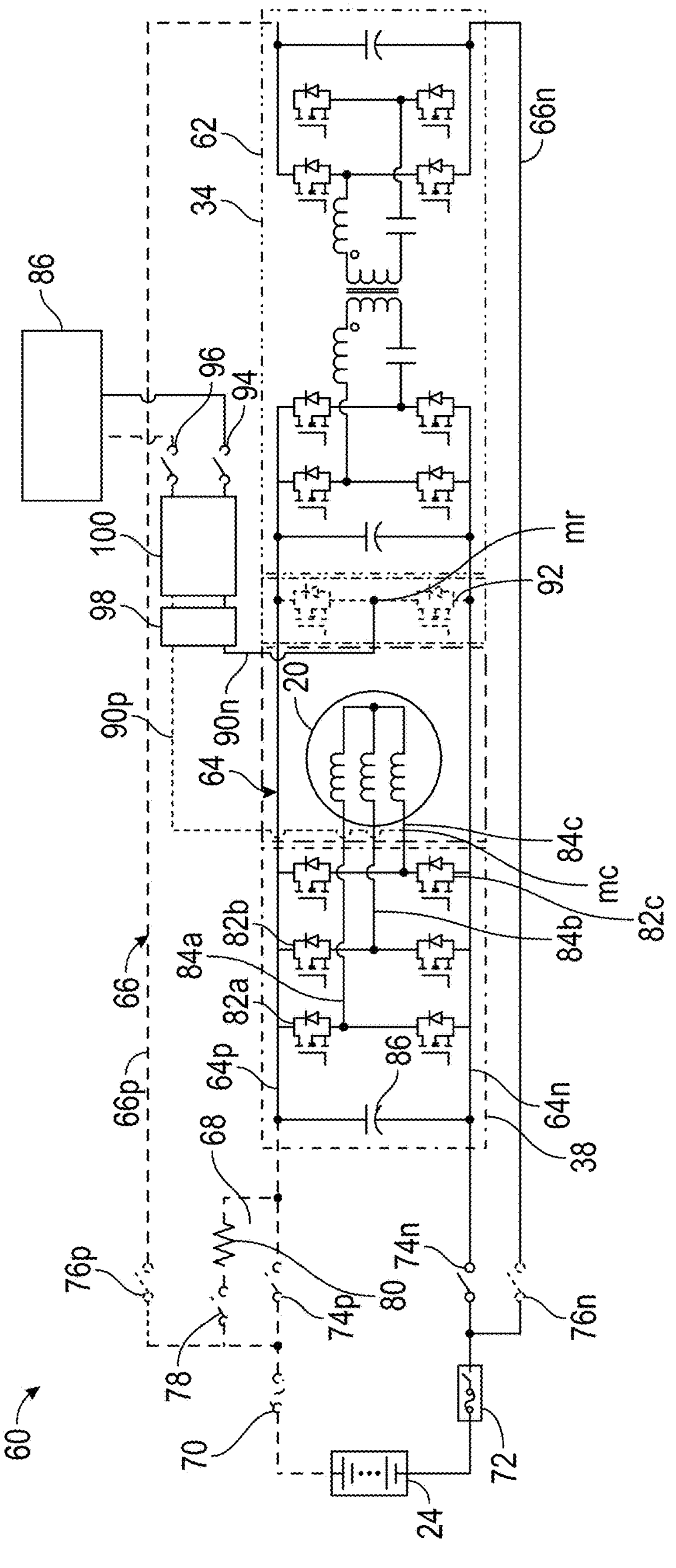
FIG. 2 schematically depicts an electrical system of a vehicle including a precharging system, in accordance with an exemplary embodiment.

FIG. 2 is a schematic diagram of the electric system 60 of the vehicle of FIG. 1. In this embodiment, the DC-DC converter 62 is isolated and connected to a propulsion bus 64 (e.g., the DC-DC converter is the DC-DC converter 34 of FIG. 1).

The propulsion bus 64 connects the battery pack 24 to the inverter 38 and the motor 20, and includes a positive propulsion bus 64*p* and a negative propulsion bus 64*n*. A charging bus 66, having a positive charging bus 66*p* and a negative charging bus 66*n*, connects the battery pack 24 to motor-inverter system for charging.

Various switches and a main precharge circuit 68 are included for selectively connecting the battery pack 24 to the propulsion bus 64 (e.g., when in a propulsion mode) and the charging bus 66 (e.g., when in an AC or DC charging mode). Other components include, for example, a main fuse 70 and a pyro switch 72. One or more of these components may be part of a battery disconnect unit (BDU).

Although various switches are described as mechanical relays, the switches may be any type of switching device, such as a field-effect transistor (FET) or other solid state switch.

The various switches include a positive high voltage switch, also referred to as a positive main switch 74*p*, and a negative high voltage switch, also referred to as a negative main switch 74*n*. A positive charge switch 76*p* and a negative charge switch 76*n* provide for selective connection of the battery pack 24 to the charging bus 66. The main precharge circuit 68 includes a switch 78 and a resistor 80.

The inverter 38 includes a half bridge for each phase of the motor 20 (phases A, B and C). A first half bridge 82*a* is connected to phase A by a phase A conductor 84*a*, a second half bridge 82*b* is connected to phase B by a phase B conductor 84*b*, and a third half bridge 82*c* is connected to phase C by a phase C conductor 84*c*. The inverter 38 also includes a capacitor 86 connected to the propulsion bus 64 in parallel with the half bridges.

The OBCM 40 includes or is connected to various components to facilitate charging (or discharging if the battery pack 24 is used to charge an external entity, such as a power grid or other vehicle). A charge port (not shown) connects a power source (e.g., an AC power source 86 such as a power grid) to a positive bus 90*p* and a negative bus 90*n* (referred to as charge port busses). The positive charge port bus 90*p* is connected to phase C of the motor 20 at a midpoint mc of the phase C conductor 84*c*. It is noted that the positive bus 90*p* can be connected to any phase.

The negative charge port bus 90*n* is connected to a midpoint mr between two switches of a synchronous rectifier bridge 92. Charging components also include switches 94 and 96 for electrically connecting and disconnecting the power source 86 from the electrical system 60, and an electromagnetic interference (EMI) filter 98.

The motor 20 and the inverter 38 are operable as a power factor correction (PFC) stage during a charging operation. For example, phase A and B legs of the inverter 38 and the motor 20 are used as a 2-phase interleaved boost converter for PFC.

The OBCM 40 also includes or is connected to a precharge circuit 100, which is operable to precharge the OBCM 40 and the propulsion bus 64 by providing for a controlled voltage increase. Precharging typically involves controlling the current flow until a target voltage is reached. The precharging circuit 100 may be configured similar to an inrush control device that is typically used to limit inrush current at startup of a system.

Precharging may be employed when the vehicle 10 initiates, or transitions to, any of a plurality of operating modes. The operating modes include a propulsion mode and a number of charging modes. Charging modes may include DC charging modes (e.g., Level 1 DC charging, Level 2 DC charging, DC fast charging (DCFC), etc.) and AC charging modes. For example, as the vehicle 10 is put into a propulsion mode (e.g., at startup), the precharging circuit 100 is utilized to energize the bus 66 and/or other components via the inverter 38 and the motor 20. The precharging circuit 100 may also be utilized when entering a charging mode.

Figure 3:
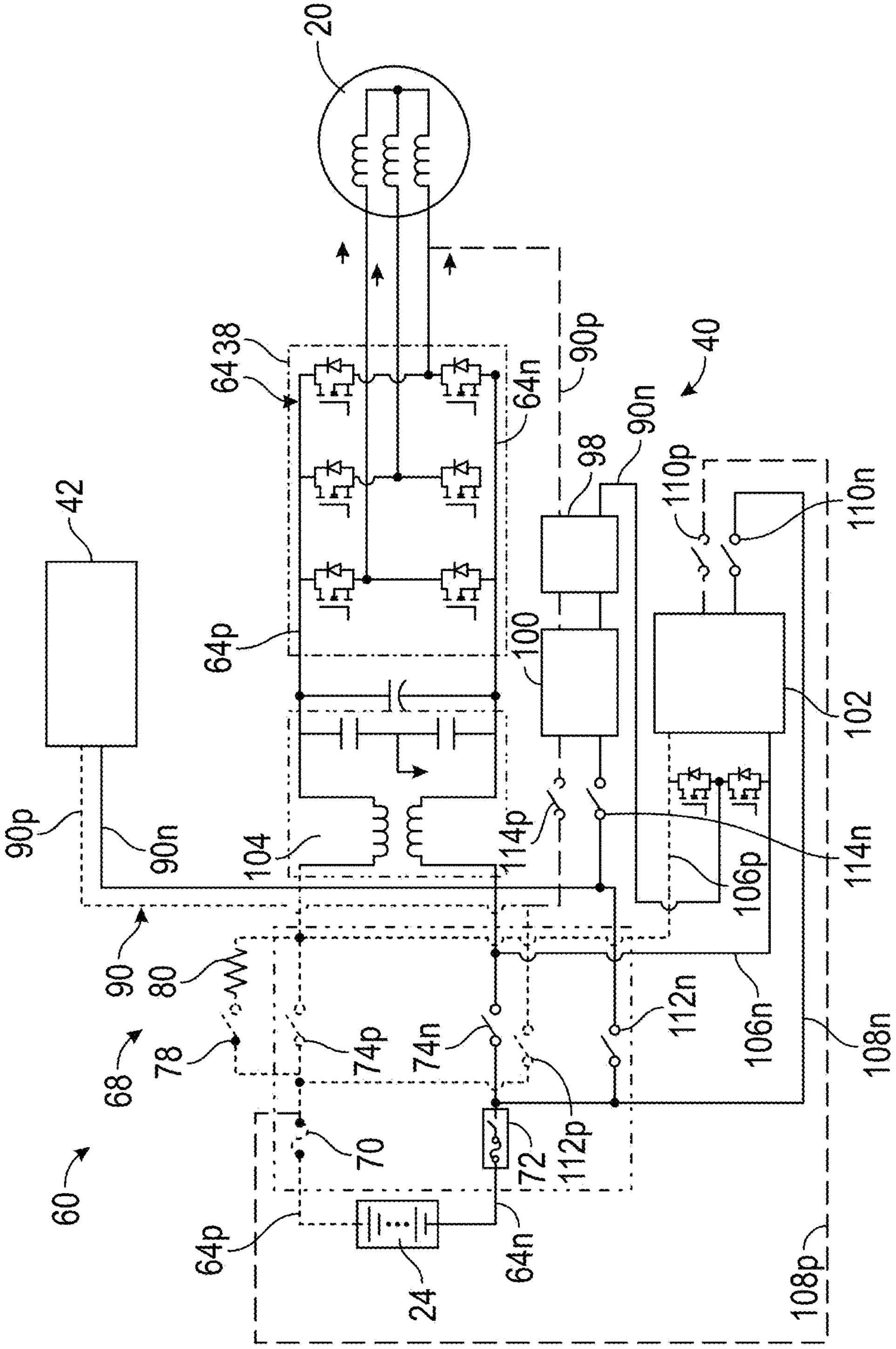
FIG. 3 schematically depicts an electrical system of a vehicle including a precharging system and a charging system connected to a charge port, in accordance with an exemplary embodiment.

FIG. 3 depicts an embodiment of the electrical system 60, in which the DC-DC conversion stage uses an isolated DC-DC converter 102, which is electrically isolated from the propulsion bus 64, the motor 20 and the inverter 38.

In this embodiment, the battery pack 24 is selectively connectable to the propulsion bus 64 via the positive main switch 74*p* and the negative main switch 74*n*. A DC choke 104 may be connected to the propulsion bus 64.

The isolated DC-DC converter 102 is connected at one side to the positive propulsion bus 64*p* by a conductor 106*p*, and is connected to the negative propulsion bus 64*n* by a conductor 106*n*. The isolated DC-DC converter 102 is connected at another side to the positive propulsion bus 64$p$ and the main precharge circuit 68 by a conductor 108$p$, and is connected to the negative propulsion bus 64$n$ by a conductor 108$n$. The isolated DC-DC converter 102 can be connected and disconnected from the propulsion bus by switches 110$p$ and 110$n$.

The electrical system 60 also includes switches for selectively connecting the battery pack 24 and components of the OBCM 40 to the charge port 42 for charging operations. In an embodiment, the charge port 42 is a bidirectional AC/DC charge port that is capable of AC and DC charging, as well as AC and DC discharging (e.g., for providing charge to another vehicle, grid or other external device or system). For example, the charge port 42 is a North American Charging System (NACS) charge port.

For example, a positive charge switch 112$p$ and a negative charge switch 112$n$ provide for selective connection of the battery pack 24 to the charge port bus 90. Switches 114$p$ and 114$n$ provide for selective connection of the OBCM 40 and the precharge circuit 100 to the propulsion bus 66.

Figure 4A:
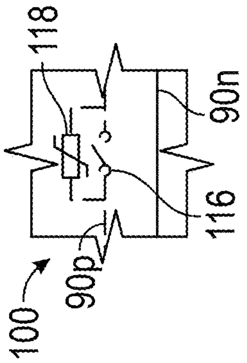
FIGS. 4A and 4B each depict components of a precharge circuit, in accordance with an exemplary embodiment.
Figure 4B:
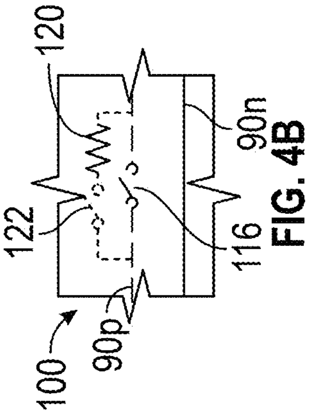

The precharge circuit 100 may be formed in any suitable manner. For example, as shown in FIG. 4A, the precharge circuit 100 includes a relay 116 across the charge port bus 90, and a variable resistor 118 connected to the charge port bus in parallel with the relay 116. In another example, shown in FIG. 4B, the precharge circuit 100 includes the relay 116, and a resistor 120 connected in series with a switch or relay 122.

Figure 5:
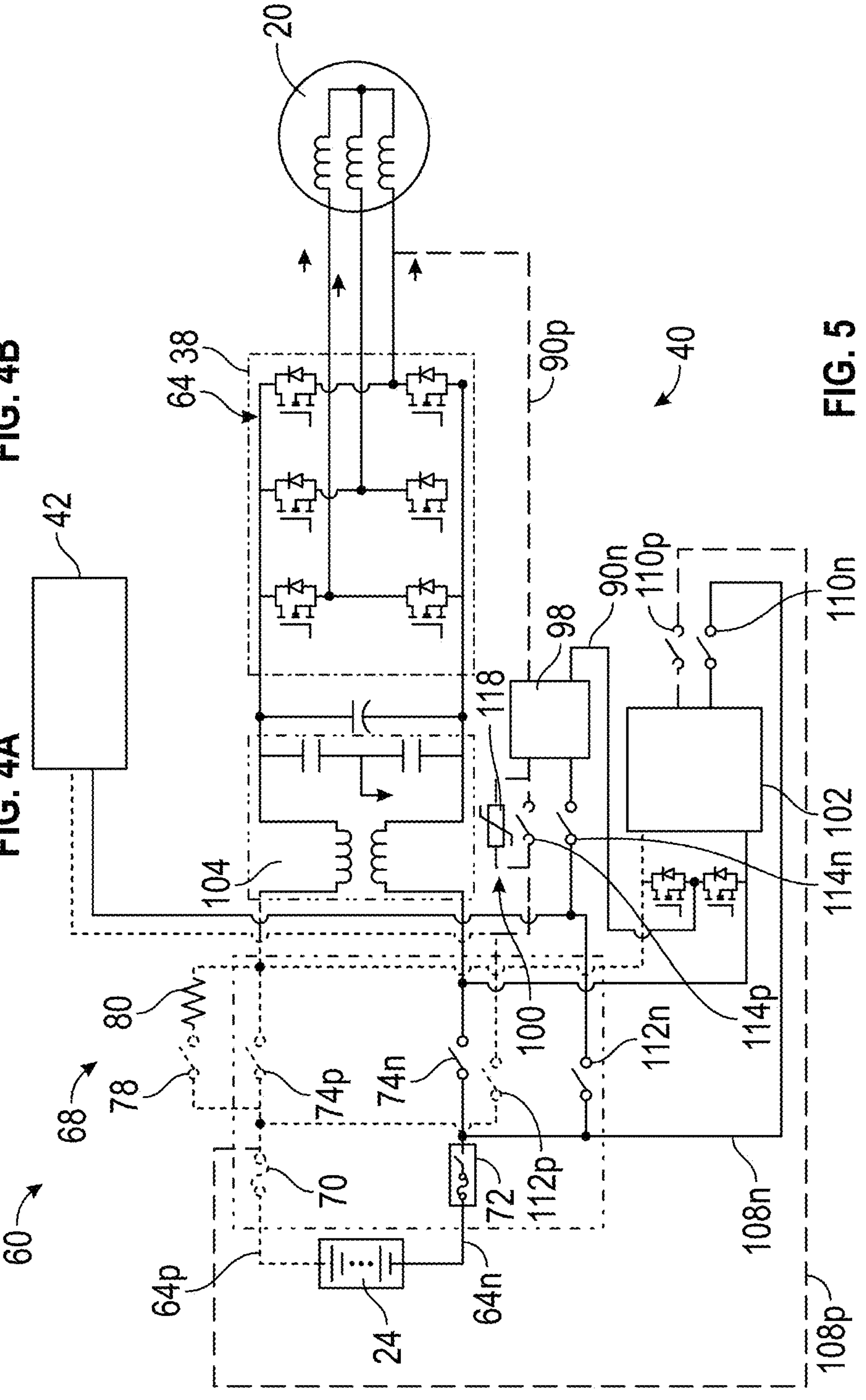
FIG. 5 schematically depicts an electrical system of a vehicle, which includes a main precharge circuit and a precharging system having a dedicated precharge circuit, in accordance with an exemplary embodiment.

FIG. 5 depicts an embodiment of the electrical system 60. This embodiment is similar to the embodiment of FIG. 3, except that the precharge circuit 100 is incorporated with the switch 114$n$. For example, the precharge circuit 100 includes the switch 114$p$, and precharging components (e.g., the variable resistor 118) are connected in parallel across the switch 114$p$. Alternatively, the switch 122 and the resistor 120 (FIG. 4B) may be connected across the switch 114$p$. Also, as shown in FIG. 5, the conductor 108$p$ may bypass the main precharge circuit 68 when connected to the propulsion bus 64.

Because pre-charging can be performed using the OBCM 40 and inrush control (precharge circuit 100), the main precharge circuit 68 is not necessary for pre-charging. The electrical system 60 may thus exclude the main precharge circuit 68. However, the main precharge circuit 68 may be included if desired.

Figure 6:
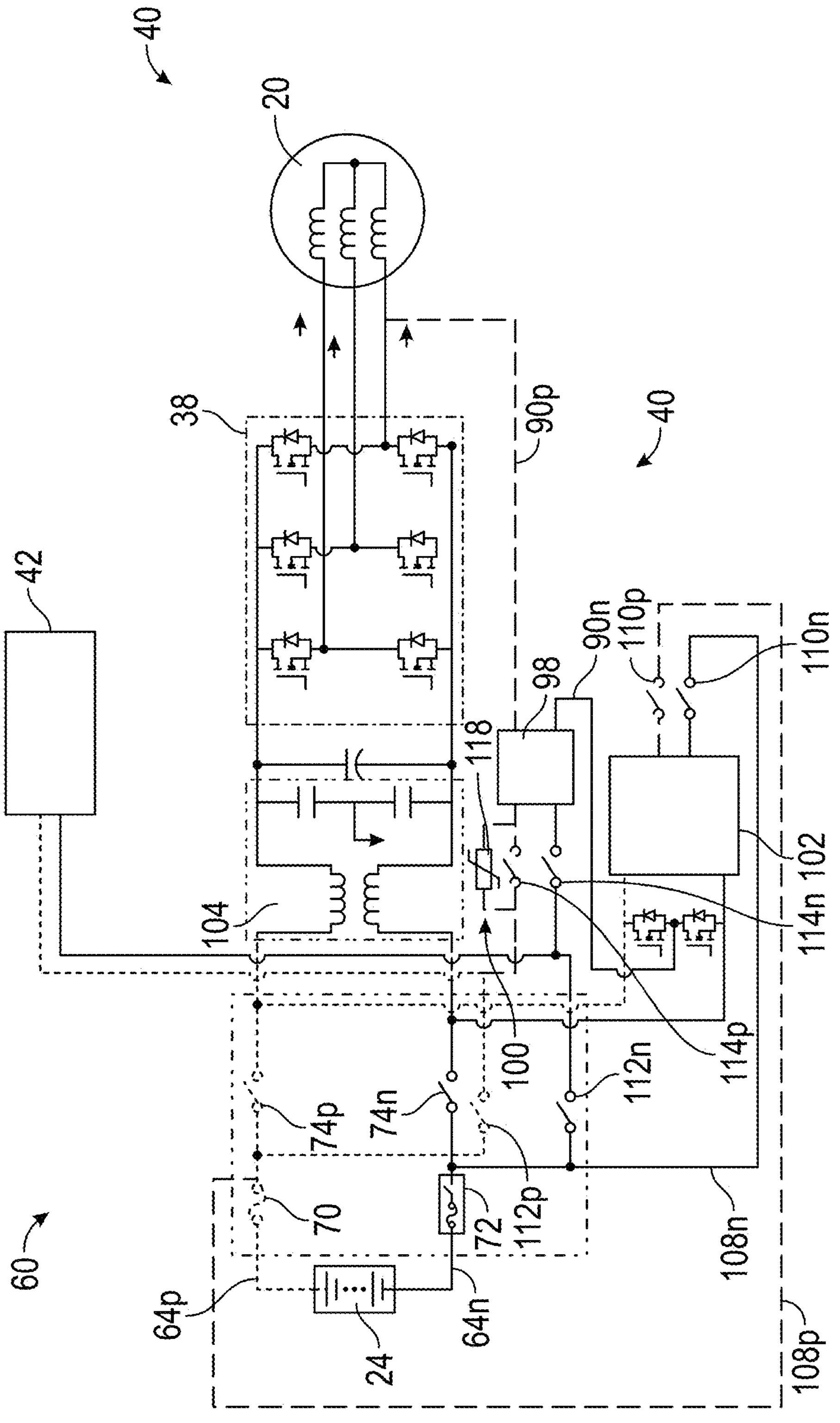
FIG. 6 schematically depicts an electrical system of a vehicle, which includes a precharging system having a dedicated precharge circuit, and which does not include a main precharge circuit, in accordance with an exemplary embodiment.

For example, the embodiment of FIG. 6 is similar to the embodiment of FIG. 5, except that the main precharge circuit 68 is excluded.

Figure 7:
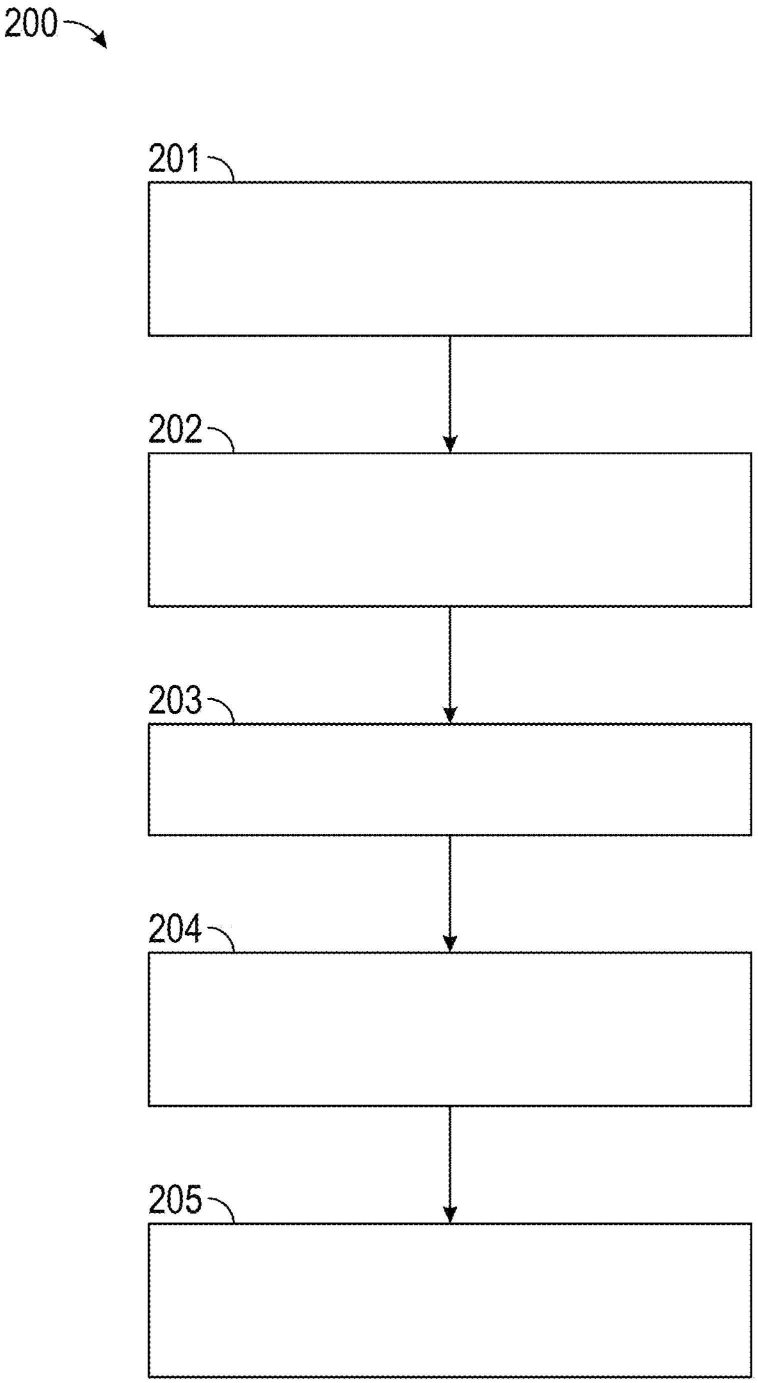
FIG. 7 is a flow diagram depicting aspects of a method of controlling an electrical system and performing a precharging process, in accordance with an exemplary embodiment.

FIG. 7 depicts an embodiment of a method 200 of controlling aspects of an electrical system. The method 200 includes a number of steps or stages represented by blocks 201-205. The method 200 is not limited to the number or order of steps therein, as some steps represented by blocks 201-205 may be performed in a different order than that described below, or fewer than all of the steps may be performed.

The method 200 is described in conjunction with the vehicle 10 of FIG. 1, the electrical system 60 of FIG. 6 and the processor 44 for illustration purposes. It is understood that the method 200 may be performed using any other embodiment described herein, as well as any suitable vehicle or other electrical system, and any suitable processing device or combination of processing devices.

At block 201, the processor 44 determines that it is desired for the vehicle 10 to transition into an operating mode. For example, the processor 44 may receive a command to put the vehicle 10 into a propulsion mode, or a charging mode. The processor 44 may make this determination based on a user request for propulsion or charging. Determination of a desired charging mode may be made based on a signal from a charging station or a signal from a component of the charge port indicating that the charge port is connected and/or indicating the type of charging.

At block 202, the processor 44 initiates transition to the desired operating mode. Initiation of the transition includes initially disconnecting the battery pack 24 from the propulsion bus 64. For example, referring to FIG. 6, the battery pack is initially disconnected from the propulsion bus 64 by opening the main switches 74$p$ and 74$n$.

At block 203, the precharging is performed in conjunction with a transition to the desired operating mode. For a charging process, precharging is performed by connecting the OBCM 40 and the precharge circuit 100 to energize the propulsion bus.

For example, if the desired operating mode is a DC charging mode, the processor 44 verifies that the main switches 74$p$ and 74$n$ are open. The processor 44 also verifies that the switches 112$n$ and 112$p$ are open (or opens these switches if currently closed). The processor 44 further verifies that the charge port 42 is connected to a power source.

The processor 44 then closes the switch 114$n$ and enables the precharge circuit 100. The propulsion bus 64 is energized via controlled current flow across the variable resistor 118, and motor-inverter switches. Once the voltage $V_{bus}$ across the propulsion bus 64 reaches a target voltage (e.g., is within a selected range of the battery voltage $V_{Batt}$.

If the desired operating mode is an AC charging mode, the processor 44 verifies that the main switches 74$p$ and 74$n$ are open. The processor 44 also verifies that the switches 112$n$ and 112$p$ are open (or opens these switches if currently closed). The processor further verifies that the charge port 42 is connected to a power source, and requests that the charge port 42 apply an AC voltage. The processor 44 then closes the switch 114$n$ and enables the precharge circuit 100.

If the desired operating mode is the propulsion mode, the processor 44 verifies that the main switches 74$p$ and 74$n$ are open, and verifies that the switches 112$n$ and 112$p$ are closed (or closes these switches if currently open). The processor 44 then closes the switch 114$n$ and enables the precharge circuit 100.

At block 204, transition to the desired operating mode is completed. If the operating mode is the DC or AC charging mode, the processor 44 closes the switches 112$p$ and 112$n$ (the main switches 74$p$ and 74$n$ remain open), and a charging may commence If the operating mode is the propulsion mode, the 74$p$ and 74$n$ are closed, and the switches 112$n$ and 112$p$ are opened.

At block 205, the vehicle 10 is operated or the charging system is operated to perform a charging process (if the desired mode is a charging mode). If the desired operating mode is the propulsion mode, the vehicle 10 may then be operated by driving the motor 20.

Figure 8:
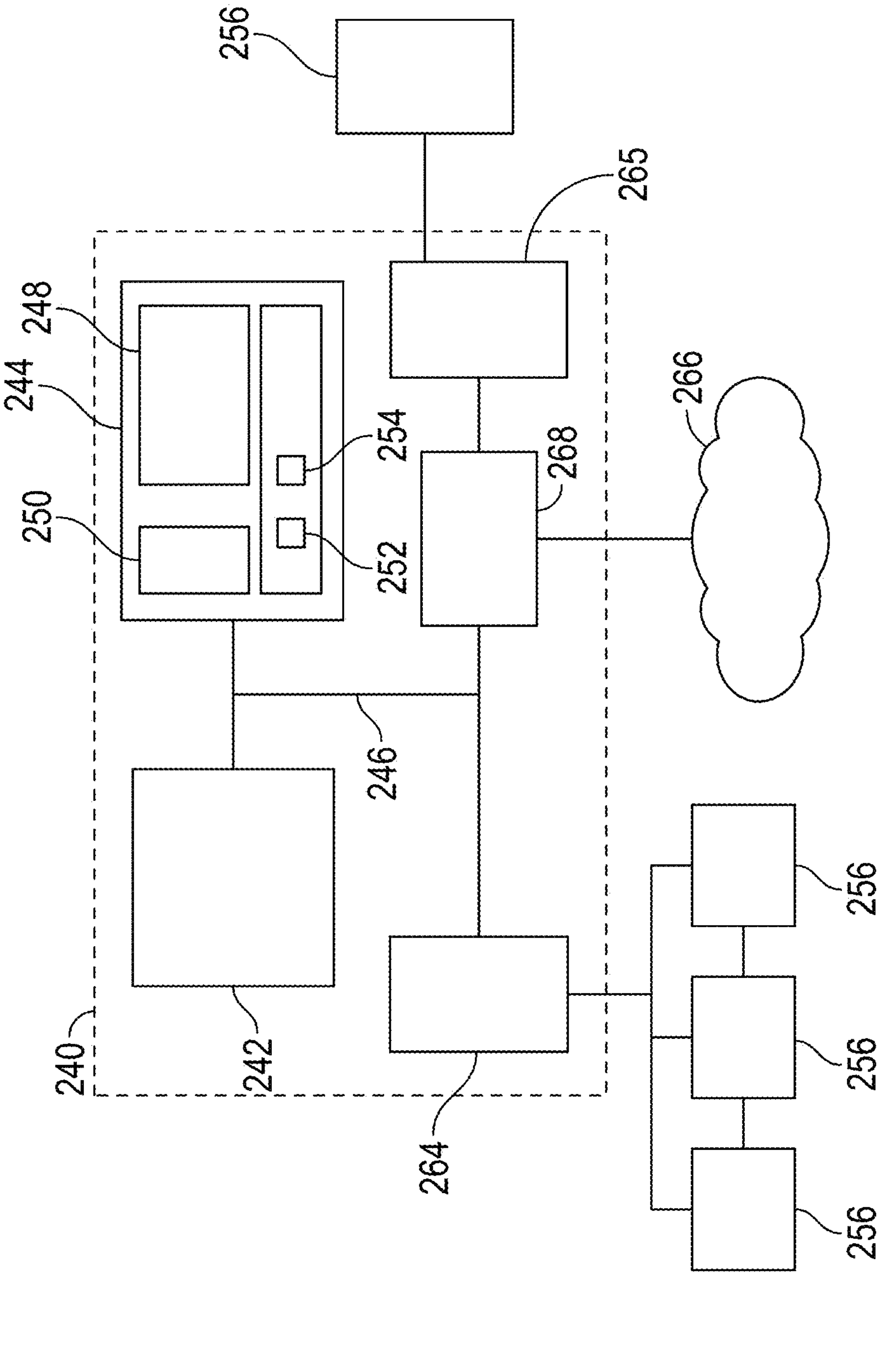
FIG. 8 depicts a computer system in accordance with an exemplary embodiment.

FIG. 8 illustrates aspects of an embodiment of a computer system 240 that can perform various aspects of embodiments described herein. The computer system 240 includes at least one processing device 242, which generally includes one or more processors for performing aspects of image acquisition and analysis methods described herein.

Components of the computer system 240 include the processing device 242 (such as one or more processors or processing units), a memory 244, and a bus 246 that couples various system components including the system memory 244 to the processing device 242. The system memory 244 can be a non-transitory computer-readable medium, and may include a variety of computer system readable media. Such media can be any available media that is accessible by the processing device 242, and includes both volatile and non-volatile media, and removable and non-removable media.

For example, the system memory 244 includes a non-volatile memory 248 such as a hard drive, and may also include a volatile memory 250, such as random access memory (RAM) and/or cache memory. The computer system 240 can further include other removable/non-removable, volatile/non-volatile computer system storage media.

The system memory 244 can include at least one program product having a set (i.e., at least one) of program modules that are configured to carry out functions of the embodiments described herein. For example, the system memory 244 stores various program modules that generally carry out the functions and/or methodologies of embodiments described herein. A module 252 may be included for performing functions related to controlling charging and/or propulsion, and a module 254 may be included to perform functions related to precharging and transitioning between operating modes. The system 240 is not so limited, as other modules may be included. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 242 can also communicate with one or more external devices 256 as a keyboard, a pointing device, and/or any devices (e.g., network card, modem, etc.) that enable the processing device 242 to communicate with one or more other computing devices. Communication with various devices can occur via Input/Output (I/O) interfaces 264 and 265.

The processing device 242 may also communicate with one or more networks 266 such as a local area network (LAN), a general wide area network (WAN), a bus network and/or a public network (e.g., the Internet) via a network adapter 268. It should be understood that although not shown, other hardware and/or software components may be used in conjunction with the computer system 40.

Examples include, but are not limited to: microcode, device drivers, redundant processing units, external disk drive arrays, RAID systems, and data archival storage systems, etc.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this invention belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A system for charging a battery, comprising:

a charge port configured to be electrically connected to an inverter and a multi-phase electric motor, the inverter and the electric motor configured to be powered by a battery;

a charging system including a charge port bus configured to electrically connect a charge port to a phase of the electric motor and to a direct current (DC)-DC converter, wherein a phase of the inverter and the electric motor forms a power factor correction (PFC) stage and the DC-DC converter forms part of a DC-DC conversion stage, and the charging system includes a precharge circuit connected to the charge port bus, the charge port bus including a positive bus configured to connect the charge port to the phase of the electric motor, the precharge circuit including a first switch across the positive charge port bus and a resistor connected to the positive charge port bus in parallel with the first switch; and a controller configured to control the precharge circuit to precharge one or more components of the charging system.

2. The system of claim 1, wherein the charge port bus includes a negative bus configured to electrically connect the charge port to a rectifier bridge connected to the propulsion bus.

3. The system of claim 1, wherein the inverter, the electric motor and the battery are connected in parallel to a propulsion bus.

4. The system of claim 3, wherein the charge port bus is connected to an active switch half bridge forming part of the PFC stage.

5. The system of claim 3, wherein the charging system includes at least one switch connected to the charge port bus, the at least one switch configured to be opened to isolate the precharge circuit and the charge port from the propulsion bus.

6. The system of claim 1, wherein the resistor is a variable resistor connected to the charge port bus in parallel with the switch.

7. The system of claim 1, wherein the precharge circuit includes a second switch connected in series with the resistor, the second switch and the resistor connected to the charge port bus in parallel with the first switch.

8. The system of claim 3, wherein the DC-DC converter is electrically isolated from the propulsion bus.

9. A method of controlling an electrical system, comprising:

receiving a request to initiate a transition to a desired operating mode, the desired operating mode being one of a propulsion mode and a charging mode, the electrical system including an inverter and a multi-phase electric motor configured to be powered by a battery via a propulsion bus, a charge port configured to be electrically connected to the inverter and the multi-phase electric motor, and a charging system including a charge port bus configured to electrically connect the charge port to a phase of the electric motor and to a direct current (DC)-DC converter, wherein part of the inverter and the electric motor form a power factor correction (PFC) stage and the DC-DC converter forms part of a DC-DC conversion stage, and the charging system includes a precharge circuit electrically connected to the charge port bus, the charge port bus including a positive bus configured to connect the charge port to the phase of the electric motor, the precharge circuit including a first switch across the positive charge port bus and a resistor connected to the positive charge port bus in parallel with the first switch;

disconnecting the battery from the propulsion bus;

precharging at least the propulsion bus by electrically connecting the precharge circuit to the charge port bus; and controlling the electrical system according to the desired operating mode.

10. The method of claim 9, wherein the inverter and the electric motor are part of a propulsion system of a vehicle.

11. The method of claim 9, wherein the inverter, the electric motor and the battery are connected in parallel to the propulsion bus.

12. The method of claim 11, wherein electrically connecting the precharge circuit includes closing at least one switch connected to the charge port bus, the at least one switch configured to be opened to isolate the precharge circuit and the charge port from the propulsion bus.

13. The method of claim 9, wherein the resistor is a variable resistor connected to the charge port bus in parallel with the switch.

14. The method of claim 9, wherein the precharge circuit includes a second switch connected in series with the resistor, the second switch and the resistor connected to the charge port bus in parallel with the first switch.

15. The method of claim 11, wherein the DC-DC converter is electrically isolated from the propulsion bus.

16. A vehicle system comprising:

a battery, an inverter and a multi-phase electric motor connected in parallel to a propulsion bus;

a charge port configured to be electrically connected to the inverter and the electric motor;

a charging system including a charge port bus configured to electrically connect a charge port to a phase of the electric motor and to a direct current (DC)-DC converter, wherein a phase of the inverter and the electric motor forms a power factor correction (PFC) stage and the DC-DC converter forms part of a DC-DC conversion stage, and the charging system includes a precharge circuit connected to the charge port bus, the charge port bus including a positive bus configured to connect the charge port to the phase of the electric motor, the precharge circuit including a first switch across the positive charge port bus and a resistor connected to the positive charge port bus in parallel with the first switch; and a controller configured to control the precharge circuit to precharge one or more components of the charging system.

17. The vehicle system of claim 16, wherein the charging system includes at least one switch connected to the charge port bus, the at least one switch configured to be opened to isolate the precharge circuit and the charge port from the propulsion bus.

18. The vehicle system of claim 16, wherein the resistor is a variable resistor connected to the charge port bus in parallel with the switch.

19. The vehicle system of claim 16, wherein the precharge circuit includes a second switch connected in series with the resistor, the second switch and the resistor connected to the charge port bus in parallel with the first switch.

20. The vehicle system of claim 16, wherein the DC-DC converter is electrically isolated from the propulsion bus.

* * * * *